May 14, 1968  F. A. MOORE  3,382,544
COTTON CLEANER
Filed Jan. 13, 1965  2 Sheets-Sheet 1
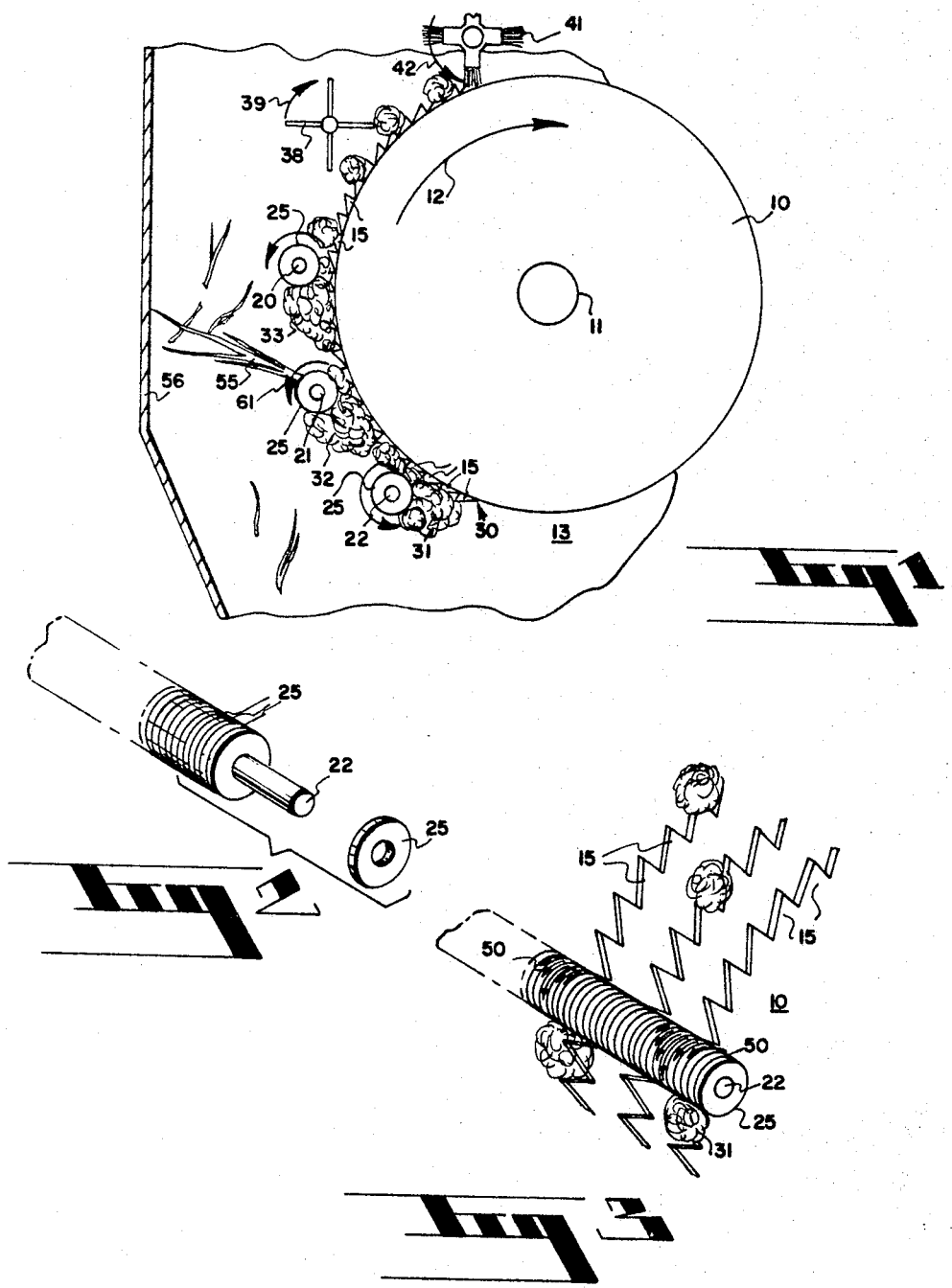
INVENTOR.
FLOYD A. MOORE
BY
McLaughlin Cahill & Drummond
ATTORNEYS

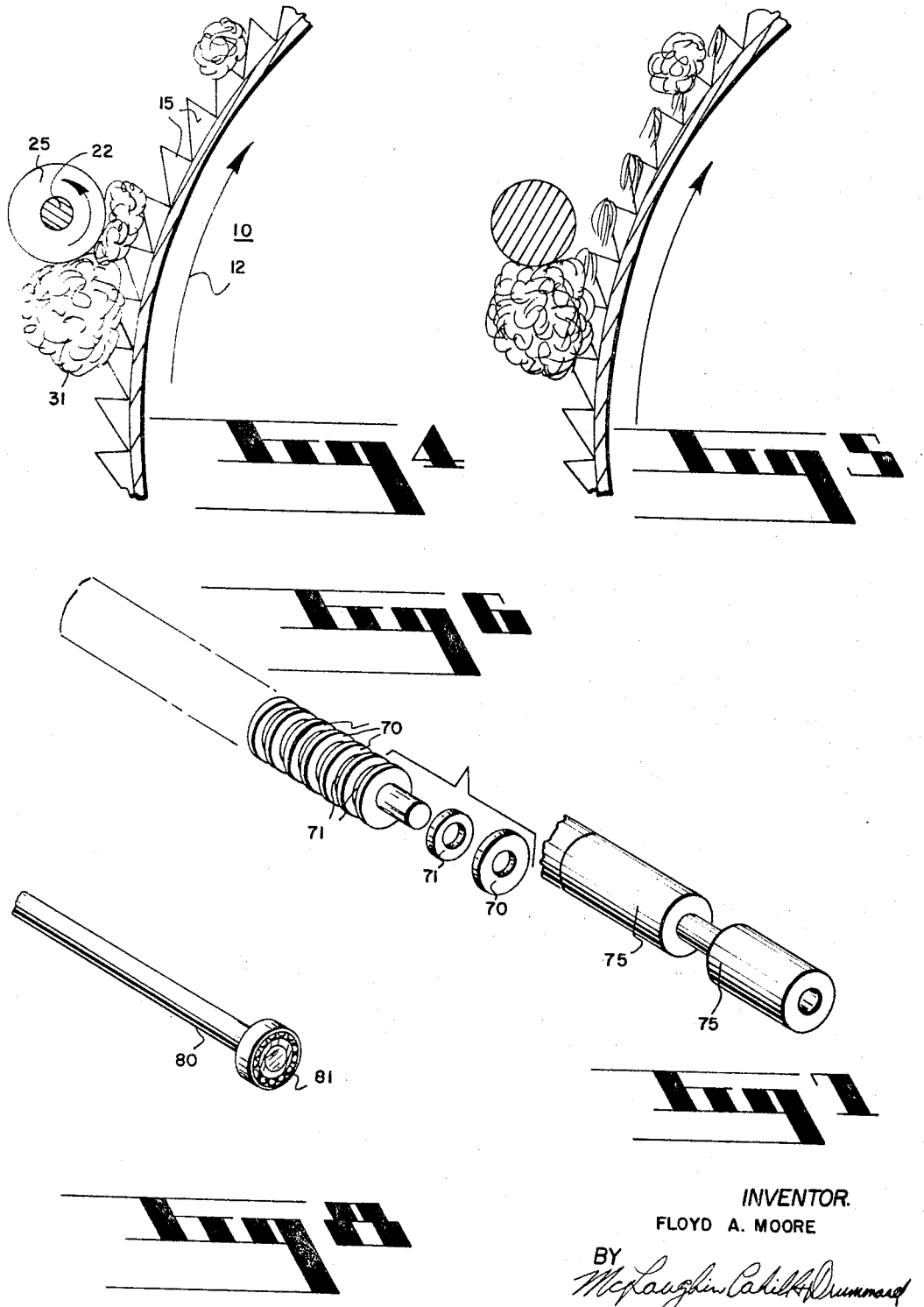

United States Patent Office 3,382,544
Patented May 14, 1968

3,382,544
COTTON CLEANER
Floyd A. Moore, Phoenix, Ariz., assignor to Garland-Rood Research and Development Company
Filed Jan. 13, 1965, Ser. No. 425,173
11 Claims. (Cl. 19—202)

ABSTRACT OF THE DISCLOSURE

A drum saw in combination with a plurality of grid bars positioned parallel to the axis of the drum saw and radially displaced from the surface thereof; each grid bar including a surface rotatable about the axis of the grid bar, the surface rotating upon contact of cotton therewith, the cotton being transported by the drum saw.

---

The present invention pertains to cotton cleaners, and more specifically, to cotton cleaners of the type utilizing rotating cotton carriers and grid bars to separate trash from cotton.

A wide variety of cotton cleaners are available on the market and a substantial number of those utilize rotating cotton carriers such as peg-tooth drums or drum saws in one form or other. Basically, drum saws comprise a rotating drum having bands of saw teeth secured to the periphery thereof for snagging and transporting cotton; a peg-tooth drum consists of a drum having radially-extending dowels or pegs secured about the periphery thereof. It is also common practice to place a plurality of grid bars, each parallel to the axis of the drum saw or peg-tooth drum, about a portion of the periphery of the drum. The grid bars perform a cleaning function by holding the cotton against the saws and by shaking loose adhering debris from the cotton as the saws drag the cotton past the grid bars.

Cotton being transported by the rotating drum frequently accumulates on the "downstream" side of the grid bar and is subsequently drawn between the drum and the grid bar by being pulled through the space between the drum and the bar as a result of snagging by the saw or peg. Whether or not the cotton accumulates on the downstream side of the grid bar, the cotton must be pulled through the opening between the grid bars and the drum; prior art arrangements of grid bars and drums frequently caused the cotton to be degraded by having the saw or peg tear or break fibers of the cotton as a result of the cotton being drawn throught the grid bar-drum space.

It is therefore an object of the present invention to provide a cotton cleaner utilizing a novel grid bar-rotating cotton carrier combination.

It is another object of the present invention to provide a cotton cleaner using grid bars and a rotating cotton carrier wherein said grid bars provide a moving surface to permit the cotton to be drawn past the grid bar without tearing the fibers of the cotton.

It is still another object of the present invention to provide a cotton cleaner utilizing grid bars and a rotating cotton carrier wherein the cotton is not damaged while it is being cleaned by passing through the drum saw-carrier combination.

Further objects and advantages of the present invention will become apparent to those skilled in the art as the description thereof proceeds.

Briefly, in accordance with one embodiment of the present invention, a drum saw is provided having a plurality of grid bars positioned parallel to the axis of the drum saw. The grid bars are also radially displaced from the surface of the drum saw to provide a drum saw-grid bar space for cotton to be transported therebetween. Each of the grid bars is provided with a surface that is rotatable about the axis of the grid bar. The rotatable surface may be provided by mounting a plurality of disks over the grid bar, each of the disks being rotatable about the grid bar. Thus, as cotton is being transported by the saw and enters the saw-grid bar space, the cotton engages the movable surface of the grid bar and rotates the same about the axis of the grid bar while the cotton is pulled from between the grid bar and the saw. The movable surface, such as the rotating disks, enables the cotton to be pulled between the bar and saw without the tight frictional engagement heretofore present in prior art devices and therefore without the damaging fiber-tearing action previously encountered. The movable surface of the grid bars also adds to the cleaning effect and also produces some unusual and unexpected results in the operation of the combination.

The present invention will be described in terms of a specific embodiment chosen to illustrate the invention; thus, the description refers hereafter to drum saws as a specific rotating cotton carrier. It will be understood that other types of rotating cotton carriers may be used, such as peg tooth drums, doffer paddles, etc., without departing from the scope and spirit of the invention.

The present invention may more readily be described by reference to the accompanying drawings in which:

FIGURE 1 is a side elevational view, partly in section, of a portion of a cotton cleaner showing the combination of the present invention.

FIGURE 2 is an isometric view of the disks mounted on the grid bars of FIGURE 1.

FIGURE 3 is an isometric view, enlarged and partly broken away, of a portion of the combination shown in FIGURE 1.

FIGURE 4 is an enlarged view of a portion of FIGURE 1 for illustrating the method of operation of the present invention.

FIGURE 5 is an illustration of a prior art technique in drum saw-grid bar combinations.

FIGURE 6 is an isometric view of a modification of the present invention such as that shown in FIGURE 1.

FIGURE 7 is another embodiment of the present invention.

FIGURE 8 is still another embodiment of the present invention showing the provision of a movable surface on the grid bar by rendering the grid bar rotatable about its own axis.

Referring now to FIGURE 1, a drum saw 10 is shown mounted on a shaft 11 for rotation in the direction indicated by the arrow 12. The shaft 11 may be supported by suitable bearings or journals in the wall 13 of a cotton cleaner. The drum saw 10 includes a plurality of bands of saw teeth 15 and may be driven in any conventional manner (not shown). A plurality of grid bars such as those shown at 20, 21, and 22 are mounted parallel to the axis of the drum saw 10 and are secured to the wall 13. Each of the grid bars includes, in the embodiment shown in FIGURE 1, a plurality of disks 25 mounted on the respective grid bars in loosely abutting relationship to each other. The disks 25 are free to rotate about the corresponding grid bar and are free to rotate relative to each other. Cotton is fed to the drum saw in a feed area 30 by any conventional manner and is snagged by the teeth 15 and carried about the drum. As the cotton is snagged, it frequently accumulates on the downstream side of each of the grid bars as indicated by the cotton accumulated at 31, 32, and 33. The cotton is transported upwardly by the drum saw, past a doffer 38 that is being rotated in the direction indicated by the arrow 39. The doffer 38 strikes sticks and debris either adhering to the cotton or snagged by the teeth of the saw and throws the debris downwardly and away from the drum. The action of the grid bars and the drum saw also cause debris and sticks to be shaken loose from the cotton and to drop as indicated in FIGURE 1. As the cotton is transported around the drum saw, it is removed from the drum saw by a doffer brush 41 rotated in the direction indicated by the arrow 42. The cotton is thus withdrawn from the drum saw and transported elsewhere for further processing.

The operation of the present invention may now be described by reference to FIGURES 1–4. Cotton is delivered, by any conventional means, to the area 30 where it is snagged by the respective saw tips of the drum saw. The cotton is transported upwardly to the grid bars where it may accumulate on the downstream side of the respective bars. Cotton in the areas indicated in FIGURE 1 at 31, 32, and 33 is subsequently snagged by the cotton transporting drum saw and pulled past the corresponding grid bar-drum saw space. As the cotton is drawn through this space, the cotton contacts the disks 25 of the grid bar and rotates these disks about the grid bar as indicated by the arrows 50 in FIGURE 3. These arrows are of a length corresponding to the motion imparted to the corresponding disk by the cotton being drawn past the grid rod. It may be seen by the varying lengths of these arrows 50 that the disks will travel at different speeds and will rotate more or less depending on the rotation imparted thereto by the cotton being drawn by the disks. When no cotton is accumulated on the downstream side of the grid bar as indicated at the middle saw in FIGURE 3, the disks mounted on the grid bar will not be contacted by cotton being drawn past the bar and will therefore not rotate. The advantages gained by the utilization of individually rotatable disks mounted on the grid bar include the advantage that the cotton being drawn by the saw past the bar engages and rotates only those disks encountered by the cotton. Rotation of the entire rod, or the portion greater than a disk, by the cotton would require the cotton to impart rotation to a substantially larger mass and would therefore cause greater stress on the fibers of the cotton engaging the saw. The motion of the cotton as it passes the grid bar is most clearly shown in FIGURE 4 where it may be seen that the cotton is compressed after being engaged by one of the teeth of the saw and is drawn past the grid bar. As it passes the grid bar, and contacts the disks, the cotton imparts rotation to the disks which rotate about the grid bar. Therefore, frictional engagement between the grid bar and the cotton is either eliminated or drastically reduced to thereby alleviate the tendency of the saw to tear the fibers of the cotton. In addition to the gentleness with which the present invention handles cotton, a further advantage is achieved through the operation of the present invention and can be described by reference to FIGURE 1. Large sticks such as that shown at 55 are frequently drawn into the cotton cleaner and are subsequently separated from the cotton and are thrown downwardly to ultimately be rejected by the cleaner. However, such large sticks 55 sometimes become jammed between a wall of the cleaner as shown at 56, and one of the grid bars. In prior art devices, such sticks became lodged in the position shown in FIGURE 1 and collected trash and debris on top thereof to ultimately clog the machine and reduce efficiency. In the instant invention, the stick 55 engages a grid bar having a surface being rotated as indicated by the arrow 61. It will be apparent that when the surface of the grid bar contacting the stick 55 is rotated by the passage of cotton between the grid bar and the drum saw, the stick 55 will be forced out of engagement in the direction indicated by the arrow 61 and will thereby be ejected from contact with the grid bar and will fall downwardly and outwardly to be discarded with other trash being separated from the cotton.

The action thus described with reference to FIGURES 1–4 may be contrasted with the prior art type of grid bar-drum saw combination as illustrated in FIGURE 5. Referring to FIGURE 5, the grid bar therein shown is of the prior art type and is simply a solid rod fixed at each end to present a stationary surface to the cotton. As the cotton is snagged and transported by the drum saw through the space between the grid bar and the drum saw, the frictional engagement of the cotton fibers with the surface of the grid bar causes the teeth of the saw to tear the fibers of the cotton before and during the transporting of the cotton past the grid bar. Tearing of cotton fibers is destructive of the value of the cotton and should be avoided if at all possible. Prior art devices using grid bars and drum saws frequently utilize cascaded arrangements whereby the cotton is subjected to a series of drum saws each having several grid bars positioned adjacent thereto. The cumulative action of the rough handling and fiber tearing is the reduction in grade of the cotton so processed.

Referring to FIGURE 6, another embodiment of the present invention is shown wherein disks 70 are spaced longitudinally of the grid bar. The disks 70 may be maintained in their spaced-apart relation relative to each other through the utilization of a plurality of rings 71. Each of the rings 71 may be free to rotate about the grid bar but is constructed having an outer diameter less than the outer diameter of the disks 70. Accordingly, the disks 70 and the rings 71 are placed alternately on the grid bar. The spaced relationship of the embodiment shown in FIGURE 6 may be chosen to provide an inter-disk space equal to or even substantially less than the thickness of the respective disks to prevent cotton fibers from being "pinched" between adjacent disks and also to prevent various kinds of trash from becoming wedged between adjacent disks.

Referring to FIGURE 7, another embodiment of the present invention is shown wherein the disks of the previous embodiments have been replaced by a plurality of tubes 75, each mounted for rotation about the grid bar. The tubes 75, while an improvement over the stationary grid bar provided by the prior art, are not as effective as the disks described previously. The tubes present a movable surface to the cotton being transported by the drum saw and the mass to be moved or accelerated by the cotton depends on the length of the individual tube sections which, as the tube length becomes smaller, approaches the mass of the disks previously described. The embodiment shown in FIGURE 8 includes grid bar 80 mounted for rotation in a bearing 81 so that the grid bar will rotate when encountered by cotton being transported by the corresponding drum saw. To reduce the mass that must be moved through frictional engagement of the cotton being transported by the grid bar, the grid bar 80 may be constructed of hollow tubing. Hollow tubing may be used to save a great deal of weight, and thus reduce the mass that must be accelerated by the cotton, without sacrificing rigidity or other desirable features of grid bars.

The present invention provides an improved cotton cleaning combination that effectively provides a means for cleaning the cotton without tearing the cotton fibers and reducing the value of the cotton. In addition, the cleaning provided by the novel combination of the present invention is improved over the prior art and debris such as large sticks are more readily removed without jamming in the cotton cleaner using the novel combination set forth herein. It will be apparent to those skilled in the art that many substitutions of elements may be made in the present invention, such as the previously mentioned variety of rotating cotton carriers, without departing from the spirit and scope thereof; accordingly, it is intended that the present invention be limited only by the claims appended hereto.

I claim:
1. In a cotton cleaner, the combination comprising:
(a) a drum saw for transporting cotton,
(b) a grid bar positioned with an axis parallel to the axis of said drum and adjacent the surface of said drum, and
(c) means rotatably mounted on said grid bar for rotating about said grid bar when engaged by cotton being transported by said saw.

2. In a cotton cleaner, the combination comprising:
   (a) a drum saw for transporting cotton,
   (b) a grid bar positioned with an axis parallel to the axis of said drum and adjacent the surface of said drum, and
   (c) a plurality of disks mounted on said grid bar for rotating about said grid bar when engaged by cotton being transported by said saw.

3. In a cotton cleaner, the combination comprising:
   (a) a drum saw for transporting cotton,
   (b) a grid bar positioned with an axis parallel to the axis of said drum and adjacent the surface of said drum,
   (c) a plurality of disks mounted on said grid bar for rotating about said grid bar when engaged by cotton being transported by said saw, and
   (d) means spacing said disks longitudinally of said bar.

4. In a cotton cleaner, the combination comprising:
   (a) a drum saw for transporting cotton,
   (b) a grid bar positioned with an axis parallel to the axis of said drum and adjacent the surface of said drum,
   (c) a plurality of disks mounted on said grid bar for rotating about said grid bar when engaged by cotton being transported by said saw, and
   (d) a plurality of rings, each having an outside diameter less than said disks, mounted on said grid bar and positioned alternately with said disks longitudinally along said bar.

5. In a cotton cleaner, the combination comprising:
   (a) a drum saw for transporting cotton,
   (b) a grid bar positioned with an axis parallel to the axis of said drum and adjacent the surface of said drum,
   (c) a plurality of tubes rotatably mounted on said grid bar for rotating about said grid bar when engaged by cotton being transported by said saw.

6. In a cotton cleaner, the combination comprising:
   (a) a drum saw for transporting cotton,
   (b) a grid bar positioned with an axis parallel to the axis of said drum and adjacent the surface of said drum, and
   (c) a plurality of tubes rotatably and coaxially mounted on said grid bar for rotating about said grid bar when engaged by cotton being transported by said saw.

7. In a cotton cleaner, the combination comprising:
   (a) a drum saw for transporting cotton,
   (b) a grid bar positioned with an axis parallel to the axis of said drum and adjacent the surface of said drum, and
   (c) a plurality of disks mounted in loosely-abutting relationship to each other on said grid bar for rotating about said grid bar when engaged by cotton being transported by said saw.

8. In a cotton cleaner, the combination comprising:
   (a) a rotating cotton carrier having an axis of rotation,
   (b) a grid bar positioned with an axis parallel to the axis of said rotating cotton carrier, and
   (c) means rotatably mounted on said grid bar for rotating about said grid bar when engaged by cotton being transported by said rotating cotton carrier.

9. In a cotton cleaner, the combination comprising:
   (a) a rotating cotton carrier having an axis of rotation,
   (b) a grid bar positioned with an axis parallel to the axis of said rotating cotton carrier, and
   (c) a plurality of disks mounted on said grid bar for rotating about said grid bar when engaged by cotton being transported by said rotating cotton carrier.

10. In a cotton cleaner, the combination comprising:
    (a) a peg-tooth drum for transporting cotton,
    (b) a grid bar positioned with an axis parallel to the axis of said drum and adjacent the surface of said drum, and
    (c) means rotatably mounted on said grid bar for rotating about said grid bar when engaged by cotton being transported by said peg-tooth drum.

11. In a cotton cleaner, the combination comprising:
    (a) a peg-tooth drum for transporting cotton,
    (b) a grid bar positioned with an axis parallel to the axis of said drum and adjacent the surface of said drum, and
    (c) a plurality of disks mounted on said grid bar for rotating about said grid bar when engaged by cotton being transported by said peg-tooth drum.

References Cited

UNITED STATES PATENTS

| | | | |
|---|---|---|---|
| 3,568 | 4/1844 | Sherard | 19—58 |
| 266,972 | 11/1882 | Coleman | 19—60 |
| 274,806 | 3/1883 | Milburn | 19—56 |
| 347,666 | 8/1886 | Van Winkle | 19—55 |
| 499,873 | 6/1893 | Cross | 19—44 |
| 2,464,009 | 3/1949 | Vanderjagt | 19—95 |
| 2,744,293 | 5/1956 | Johnson | 19—55 |
| 3,172,165 | 3/1965 | Helm | 19—203 |
| 1,680,978 | 8/1928 | Garner | 19—93 |
| 2,746,094 | 5/1956 | Curley | 19—95 |
| 2,929,112 | 3/1960 | Massey et al. | 19—95 |

FOREIGN PATENTS 251,452   5/1926   Great Britain.

ROBERT R. MACKEY, *Acting Primary Examiner.*

I. C. WADDEY, *Assistant Examiner.*